US012533919B2

United States Patent
Shrivastava et al.

(10) Patent No.: US 12,533,919 B2
(45) Date of Patent: Jan. 27, 2026

(54) JOUNCE BUMPER

(71) Applicant: GM GLOBAL TECHNOLOGY OPERATIONS LLC, Detroit, MI (US)

(72) Inventors: Abhinav Shrivastava, Pune (IN); Phani S. Aluru, Karnataka (IN); Mine Tasci, Walled Lake, MI (US); Michael S. Wright, Farmington Hills, MI (US); Ravindra P Patil, Troy, MI (US); Claudius Kerges, Troy, MI (US); Matthew Gregory Wieczorek, Imlay City, MI (US); Paramvir Sekhon, Windsor (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 408 days.

(21) Appl. No.: 18/121,633

(22) Filed: Mar. 15, 2023

(65) Prior Publication Data

US 2024/0308287 A1    Sep. 19, 2024

(51) Int. Cl.
*F16F 9/58*      (2006.01)
*B60G 13/18*     (2006.01)
*B60G 99/00*     (2010.01)

(52) U.S. Cl.
CPC ........... *B60G 13/18* (2013.01); *B60G 99/006* (2013.01); *B60G 2204/128* (2013.01); *B60G 2204/129* (2013.01); *B60G 2206/013* (2013.01); *B60G 2206/41* (2013.01); *B60G 2206/81012* (2013.01)

(58) Field of Classification Search
CPC .................. B60G 13/18; B60G 99/006; B60G 2204/128; B60G 2204/129; B60G 2204/45; B60G 2206/013; B60G 2206/41; B60G 2206/81012; B60G 2204/4502; B60G 2202/143; F16F 9/58; F16F 1/371; F16F 1/40
USPC ........................................ 267/141.1
See application file for complete search history.

(56) References Cited

U.S. PATENT DOCUMENTS

| 4,754,958 | A  | * | 7/1988  | Markowski | F16F 1/40   |
|           |    |   |         |           | 267/141.1   |
| 8,070,143 | B2 | * | 12/2011 | Wietharn  | B60G 11/22  |
|           |    |   |         |           | 267/141.1   |
| 8,613,430 | B2 | * | 12/2013 | Leonard   | B60G 17/0521|
|           |    |   |         |           | 267/64.19   |
| 8,720,937 | B2 | * | 5/2014  | Noble     | B60G 11/24  |
|           |    |   |         |           | 267/141.1   |
| 8,746,663 | B2 | * | 6/2014  | Mitsch    | F03D 80/00  |
|           |    |   |         |           | 267/141.1   |
| 9,764,612 | B2 | * | 9/2017  | Al-Dahhan | F16F 3/093  |
| 10,000,102| B2 | * | 6/2018  | Nolte     | F16F 1/377  |
| 10,274,036| B2 | * | 4/2019  | Al-Dahhan | F16F 1/376  |

(Continued)

FOREIGN PATENT DOCUMENTS

CN       114787530 A   *   7/2022   .............. F16F 3/12

*Primary Examiner* — Thomas W Irvin

(57) ABSTRACT

The present disclosure includes a jounce bumper with a main body and an insert. The main body includes a first polymeric material. The insert is integral with the main body and includes a second polymeric material that is different from the first polymeric material. The insert further includes a first plate, a second plate, and a connecting lattice that connects the first plate and the second plate together. The first polymeric material of the main body is between the first plate and the second plate, and is within the connecting lattice.

18 Claims, 5 Drawing Sheets

(56) References Cited

U.S. PATENT DOCUMENTS

| | | | |
|---|---|---|---|
| 10,704,636 B2* | 7/2020 | Al-Dahhan | F16F 1/377 |
| 11,667,169 B2* | 6/2023 | Touzard | F16F 1/3732 |
| | | | 267/292 |
| 11,959,526 B2* | 4/2024 | Heidemann | F16F 1/377 |
| 12,202,311 B2* | 1/2025 | Zegveld | B60G 17/0521 |
| 2015/0239315 A1* | 8/2015 | Al-Dahhan | F16F 3/093 |
| | | | 267/293 |
| 2018/0245652 A1* | 8/2018 | Al-Dahhan | F16F 1/377 |
| 2022/0234405 A1* | 7/2022 | Heidemann | F16F 1/377 |
| 2022/0281277 A1* | 9/2022 | Touzard | F16F 9/58 |
| 2024/0083210 A1* | 3/2024 | Zegveld | B60G 17/0521 |

* cited by examiner

JOUNCE BUMPER

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a jounce bumper.

Vehicle suspension systems typically include a jounce bumper. The jounce bumper may be included with a shock absorber, or attached to a vehicle suspension system as an independent component, for example. Jounce bumpers absorb energy and limit suspension travel during interaction with potholes, curbs, etc. Compared to similarly sized vehicles with an Internal Combustion Engine (ICE), a Battery Electric Vehicle (BEV) typically has a much greater mass due to its heavy battery. BEVs therefore require a suspension that can absorb more energy compared to similar ICE vehicles and can fit in a similarly sized area.

SUMMARY

In various features, the present disclosure includes a jounce bumper with a main body and an insert. The main body includes a first polymeric material. The insert is integral with the main body and includes a second polymeric material that is different from the first polymeric material. The insert further includes a first plate, a second plate, and a connecting lattice that connects the first plate and the second plate together. The first polymeric material of the main body is between the first plate and the second plate, and is within the connecting lattice.

In further features, the jounce bumper includes a center aperture extending along a longitudinal axis of the jounce bumper and configured to receive a rod, the center aperture defined by each of the main body, the first plate, and the second plate.

In further features, the jounce bumper includes first outer apertures defined by the first plate and second outer apertures defined by the second plate, the first outer apertures and the second outer apertures are outboard of an axial center of the jounce bumper. The first outer apertures are aligned with the second outer apertures.

In further features, the first plate is on top of the main body, and the first polymeric material of the main body protrudes outward through the first outer apertures beyond an outer surface of the first plate.

In further features, the insert further includes at least one retention member configured to secure the jounce bumper at a mounting location.

In further features, the connecting lattice is a first connecting lattice and the insert further includes a third plate and a second connecting lattice that connects the second plate and the third plate together.

In further features, the insert further includes a fourth plate and a third connecting lattice that connects the third plate and the fourth plate together.

In further features, the connecting lattice extends about an outer perimeter of the insert.

In further features, the connecting lattice has one of a honeycomb shape, a triangle shape, and a parallelogram shape.

In further features, the connecting lattice defines a plurality of hexagonal apertures each one of which is between a first pair of opposing frustum-shaped apertures and a second pair of opposing frustum-shaped apertures.

In further features, the connecting lattice defines a plurality of triangular apertures arranged in alternating right side up and upside down orientations.

In further features, the connecting lattice defines a plurality of parallelogram-shaped apertures extending around an outer periphery of the insert.

In further features, the jounce bumper is configured to be mounted to a shock absorber for a vehicle.

In further features, the first polymeric material includes microcellular urethane, and the second polymeric material includes thermoplastic urethane.

In various features, the present disclosure includes a jounce bumper with a main body including a first polymeric material. An insert is integral with the main body. The insert includes a second polymeric material that is more rigid than the first polymeric material. The insert includes a first plate, a second plate, and a third plate each defining outer apertures spaced outward from a longitudinal axis of the jounce bumper. The outer apertures are aligned in a direction parallel to the longitudinal axis. The first polymeric material of the main body fills the outer apertures. A first connecting lattice is between the first plate and the second plate. A second connecting lattice is between the second plate and the third plate. The first polymeric material of the main body is between the first plate and the second plate, between the second plate and the third plate, within the first connecting lattice, and within the second connecting lattice.

In further features, the first connecting lattice extends between an outer periphery of each of the first plate and the second plate, and the second connecting lattice extends between an outer periphery of each of the second plate and the third plate.

In further features, each one of the first connecting lattice and the second connecting lattice has one of a honeycomb shape, a triangle shape, and a parallelogram shape.

In further features, the first polymeric material includes microcellular urethane, and the second polymeric material includes thermoplastic urethane.

In further features, a center aperture extends along the longitudinal axis of the jounce bumper, the center aperture defined by each of the main body, the first plate, the second plate, and the third plate.

In various features, the present disclosure includes a jounce bumper with a main body including microcellular urethane. An insert is integral with the main body and includes thermoplastic urethane. The insert further includes a first plate, a second plate, and a third plate each defining outer apertures spaced apart from a longitudinal axis of the jounce bumper. The outer apertures are aligned in a direction parallel to the longitudinal axis. The microcellular urethane of the main body fills the outer apertures. A first connecting lattice extends between an outer periphery of both the first plate and the second plate. The first connecting lattice defines a plurality of first openings arranged about the insert. The plurality of first openings are filled with the microcellular urethane of the main body. A second connecting lattice extends between an outer periphery of both the second plate and the third plate. The second connecting lattice defines a plurality of second openings arranged about the insert, the plurality of second openings filled with the microcellular urethane of the main body. A center aperture extends along the longitudinal axis of the jounce bumper. The center aperture is defined by each of the main body, the first plate, the second plate, and the third plate. The microcellular urethane of the main body is between the first plate and the second plate and between the second plate and the third plate.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
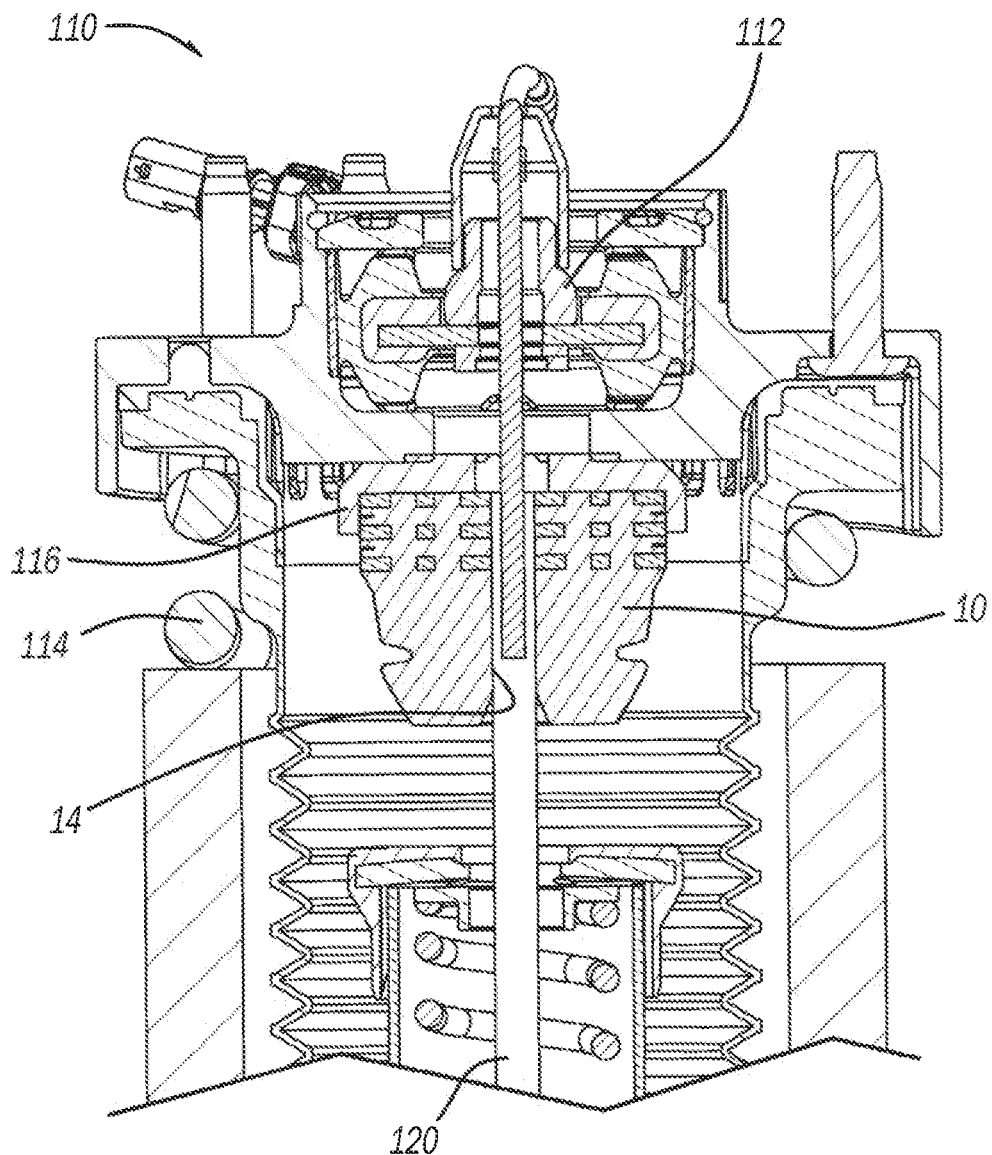
FIG. 1 is a cross-sectional view of a shock absorber including an exemplary jounce bumper in accordance with the present disclosure.
Figure 2:
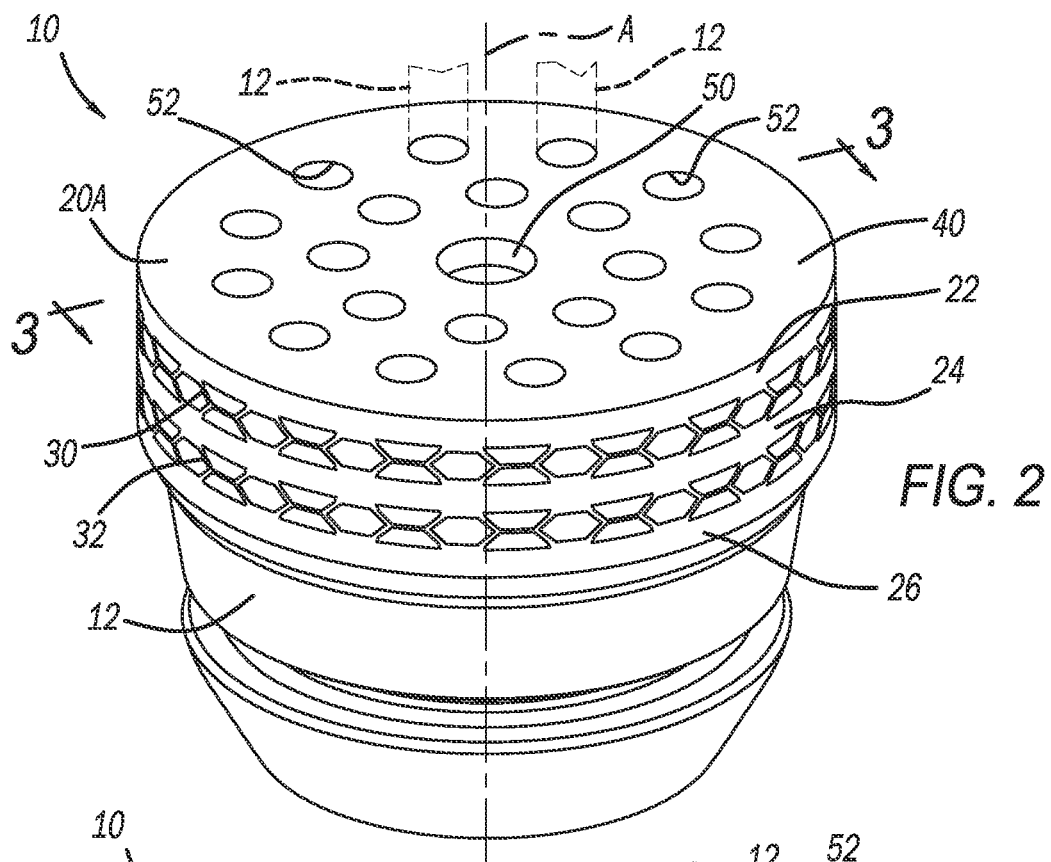
FIG. 2 is a perspective view of the jounce bumper of FIG. 1.
Figure 3:
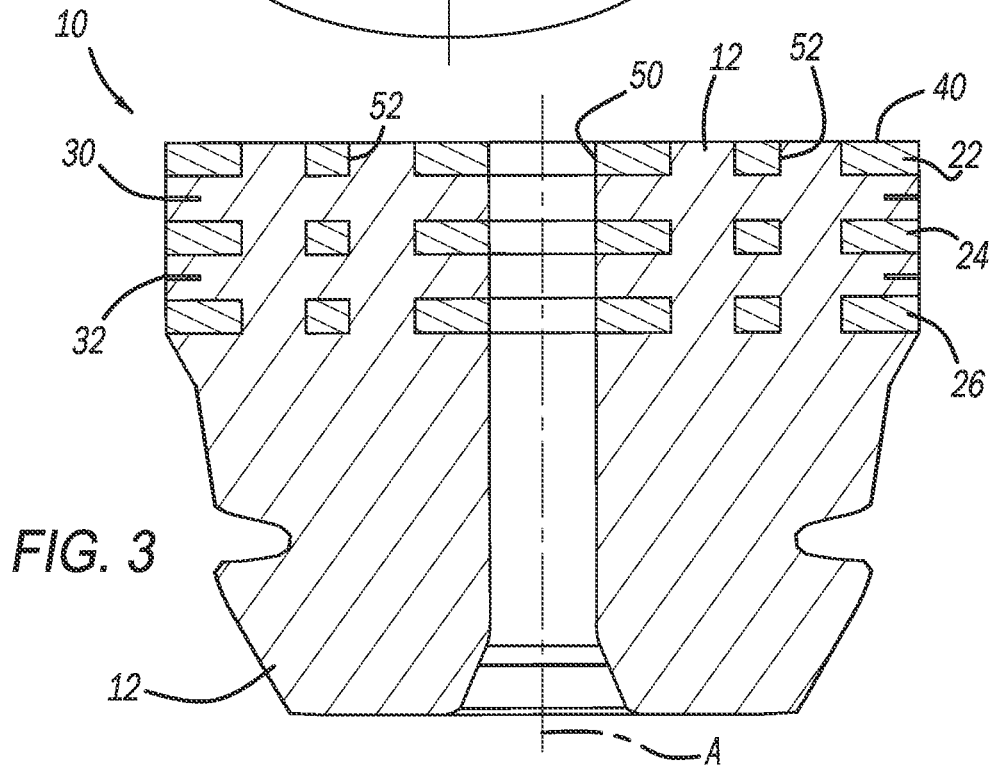
FIG. 3 is a cross-sectional view taken along line 3-3 of FIG. 2.
Figure 4:
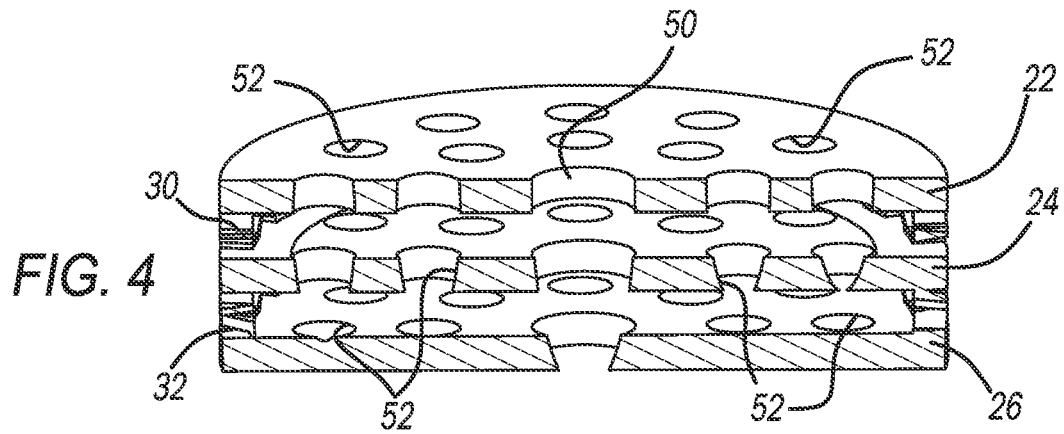
FIG. 4 is a cross-sectional view of an insert of the jounce bumper of FIG. 1.

FIGS. 1-3 insert an exemplary jounce bumper 10 in accordance with the present disclosure. The jounce bumper 10 is configured to absorb energy and dampen noise, vibration, and harshness (NVH) when installed in a vehicle suspension system. For example, and as illustrated in FIG. 1, the jounce bumper 10 is configured for use with a shock absorber 110. The jounce bumper 10 may be included with any other suitable suspension component as well. For example, the jounce bumper 10 may be included in a strut, be directly connected to a vehicle frame, or be directly connected to a vehicle control arm. The jounce bumper 10 may be configured for use with any suitable non-vehicular applications as well. For example, the jounce bumper 10 may be included with an aircraft landing gear system, an elevator stop system, a machinery stop system, etc. The jounce bumper 10 may generally be configured for use in any application where energy absorption is needed. The jounce bumper 10 may be configured for use in any deflection driven application where high energy absorption is needed from mechanical impact and/or contact.

In the example of FIGS. 1-6, the jounce bumper 10 generally includes a main body 12 and an insert 20A. The main body 12 is made of any suitable polymeric material, such as microcellular urethane (MCU). The insert 20A is made of any suitable polymeric material, such as thermoplastic urethane (TPU). The TPU is more rigid than the MCU, and provides the jounce bumper 10 with additional energy absorption properties as compared to jounce bumpers without the insert 20A. With the addition of any suitable retention feature at a base of the jounce bumper 10, the insert 20A can also retain the jounce bumper 10 and act as a connection point between suspension components for frame mounted jounce bumpers.

The insert 20A is molded using any suitable TPU injection molding process. After the TPU insert 20A has been molded, it is placed into a mold for the main body 12. MCU foam is injected into the mold containing the TPU insert 20A so that the insert 20A is integrated into the main body 12. The MCU of the main body 12 flows into various apertures and other openings of the insert 20A, as described herein.

In the example of FIGS. 1-6, the insert 20A includes a first plate 22, a second plate 24, and a third plate 26. Although the insert 20A includes three plates 22, 24, and 26, any suitable number of plates may be included, as explained further herein. Between the first plate 22 and the second plate 24 is a first connecting lattice 30. The first connecting lattice 30 extends about an outer periphery or perimeter of both the first plate 22 and the second plate 24 to connect the first plate 22 and the second plate 24 together. Between the second plate 24 and the third plate 26 is a second connecting lattice 32. The second connecting lattice 32 extends about an outer periphery or perimeter of both the second plate 24 and the third plate 26 to connect the second plate 24 and the third plate 26 together. Exemplary structures for the first connecting lattice 30 and the second connecting lattice 32 are described herein.

The first plate 22 includes an outer face 40. The insert 20A may be arranged such that the MCU of the main body 12 does not cover the outer face 40, and thus the outer face 40 is exposed at an exterior of the jounce bumper 10. Alternatively, the MCU of the main body 12 may cover the outer face 40. The MCU of the main body 12 may cover the outer face 40 in its entirety, or MCU "bumps" coaxial with apertures 52 can protrude above the outer face 40 to reduce or prevent noise at an interface between the jounce bumper 10 and the cup 116.

In applications where the jounce bumper 10 is configured to be installed on the shock absorber 110, the jounce bumper 10 defines a center aperture 50 extending along a longitudinal axis A of the jounce bumper 10. The longitudinal axis A extends through a radial center of the jounce bumper 10. The center aperture 50 is defined by each one of the first plate 22, the second plate 24, the third plate 26, and the main body 12. The center aperture 50 is configured to receive a piston rod 120 of the shock absorber 110. The piston rod 120 extends through a spring 114. The shock absorber 110 includes an upper mount assembly 112 with a cup 116 configured to receive the jounce bumper 10. In applications where the jounce bumper 10 is configured as a non-shock or non-strut type bumper, the center aperture 50 is not necessary.

The insert 20A further defines a plurality of outer apertures 52, which are arranged about the center aperture 50. The outer apertures 52 are defined by, and extend through, each one of the first plate 22, the second plate 24, and the third plate 26. The outer apertures 52 aid in flow of the MCU during manufacturing. The MCU of the main body 12 fills the outer apertures 52. With reference to FIG. 2, in some applications the MCU of the main body 12 may protrude outward from the outer apertures 52 beyond the outer face 40 to provide additional energy absorption.

Figure 5:
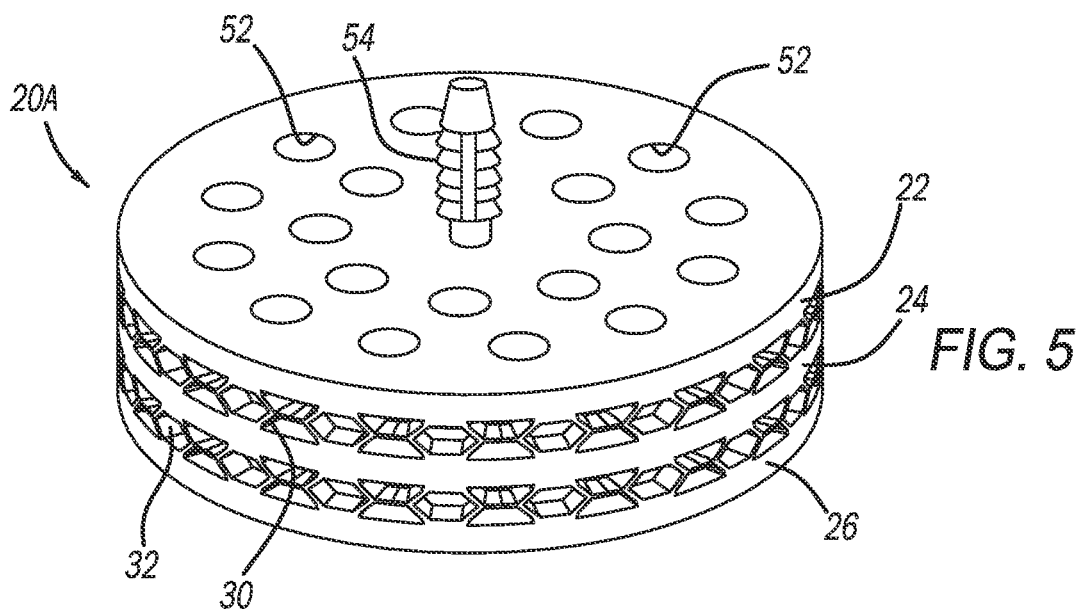
FIG. 5 is a perspective view of the insert of the jounce bumper of FIG. 1.

With particular reference to FIG. 5, the insert 20A may include one or more retention members 54. The retention members 54 may be configured in any suitable manner to secure the insert 20A in position when, for example, not installed on a shock rod. In the example illustrated, the retention member 54 is configured as a "Christmas Tree" type retention member. The Christmas Tree retention member 54 is at a center of the first plate 22, and the insert 20A is configured without the center aperture 50. The retention members 54 may be configured in any suitable manner for retaining the jounce bumper 10 at any suitable mounting location, such as the frame of the vehicle.

Figure 6:
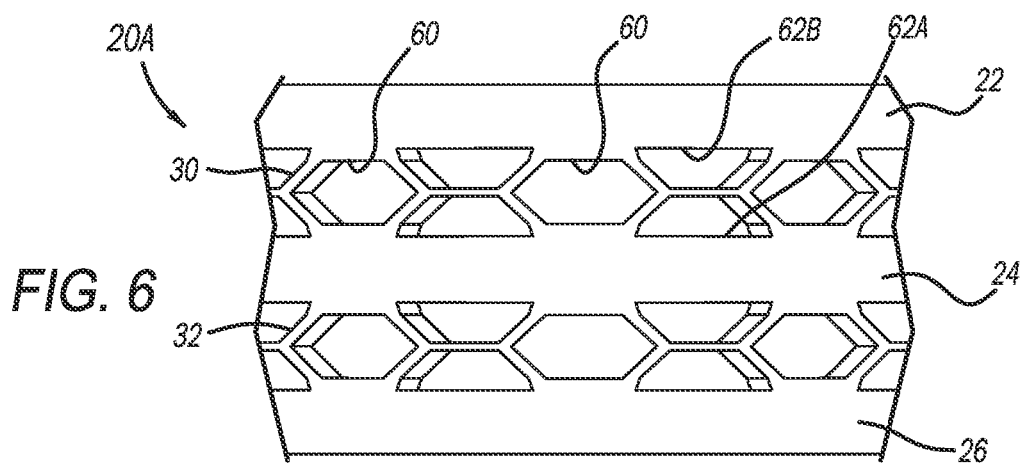
FIG. 6 is a side view of the insert of the jounce bumper of FIG. 1.

With particular reference to FIG. 6, the first and second connecting lattices 30, 32 of the insert 20A generally have a honeycomb shape. More specifically, the first connecting lattice 30 defines a plurality of hexagonal apertures 60 spaced apart about a perimeter of the insert 20A. Between the hexagonal apertures 60 is an upright frustum-shaped aperture 62A and an inverted frustum-shaped aperture 62B. The inverted frustum-shaped aperture 62B is opposite to the upright frustum-shaped aperture 62A. The second connecting lattice 32 is similar to, or the same as, the first connecting lattice 30. Thus, the description of the first connecting lattice 30 also applies to the second connecting lattice 32.

The first and second connecting lattices 30, 32 are configured to compress and absorb energy. The first plate 22, the second plate 24, and the third plate 26 are configured to provide a desired block height for the jounce bumper 10. As a result, the insert 20A provides the main body 12 with additional energy absorbing capabilities. As compared to jounce bumpers without the insert 20A, the jounce bumper 10 is configured to absorb more energy at a particular travel distance.

Figure 7:
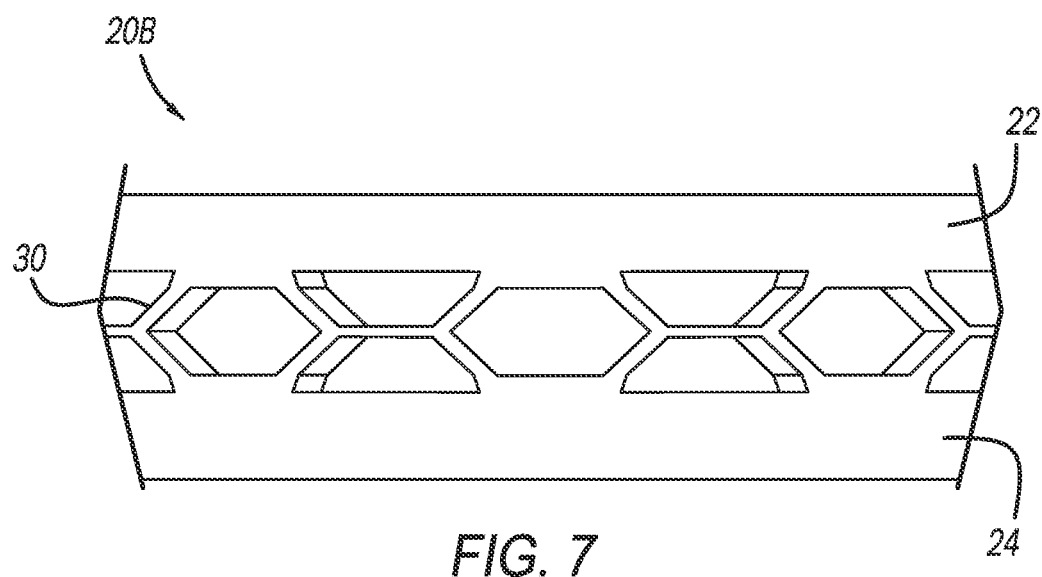
FIG. 7 is a side view of another exemplary insert for the jounce bumper in accordance with the present disclosure.

The insert 20A may be configured in any other suitable manner, or the jounce bumper 10 may include any other suitable insert, so as to "tune" the jounce bumper 10 to absorb a particular amount of energy at a particular travel distance and have a particular block height. For example, the number of plates 22, 24, 26 may be modified, and/or the configuration of the first and the second lattices 30, 32 may be modified with respect to the number, angle, and thickness of their constituting elements. Elements of the lattice 30 may be tuned independent of the elements of the lattice 32, for example. Similarly, the plates 22, 24, and 26 may have different thicknesses as needed to achieve desired jounce bumper characteristics. With reference to FIG. 7, for example, the insert 20A may be replaced with an insert 20B. The insert 20B is the same as, or substantially similar to, the insert 20A, except that the insert 20B includes only the first plate 22, the second plate 24, and the first connecting lattice 30. The insert 20B does not include the third plate 26 or the second connecting lattice 32. As a result, the insert 20B will absorb less energy than the insert 20A.

Figure 8:
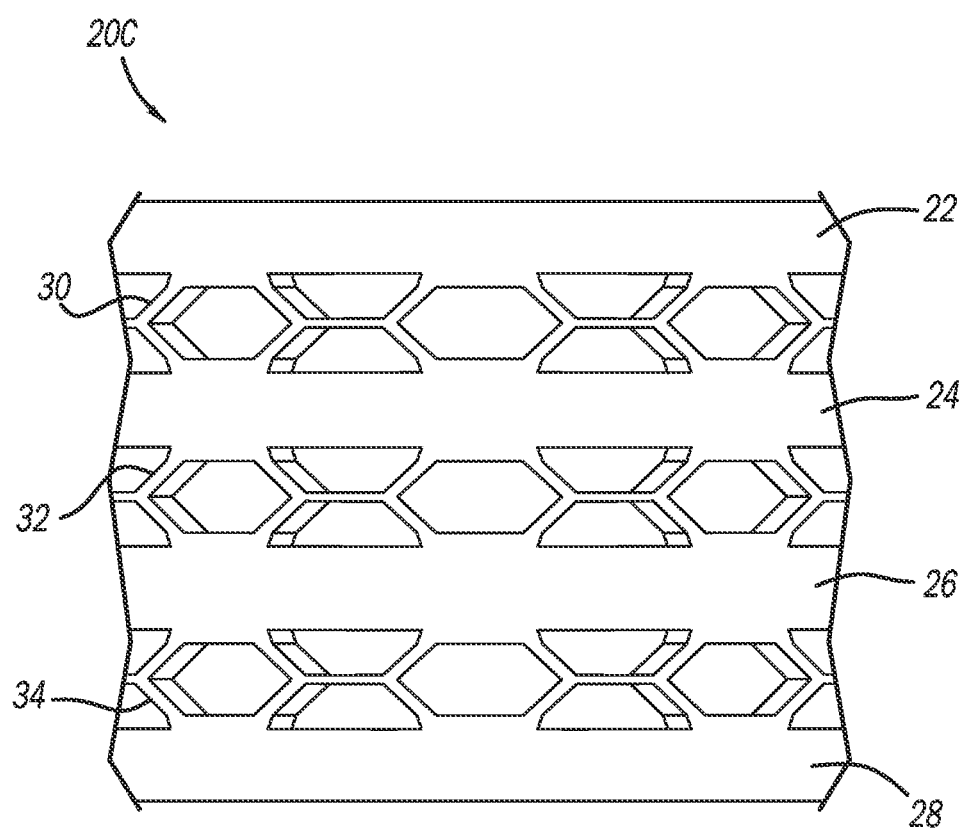
FIG. 8 is a side view of an additional exemplary insert for the jounce bumper in accordance with the present disclosure.

FIG. 8 illustrates another exemplary insert 20C in accordance with the present disclosure for the jounce bumper 10. The insert 20C is similar to the insert 20A, but includes a fourth plate 28. A third connecting lattice 34 connects the fourth plate 28 to the third plate 26. The third connecting lattice 34 is the same as, or substantially similar to, the first connecting lattice 30 and the second connecting lattice 32. The insert 20A may be replaced with the insert 20C.

Figure 9:
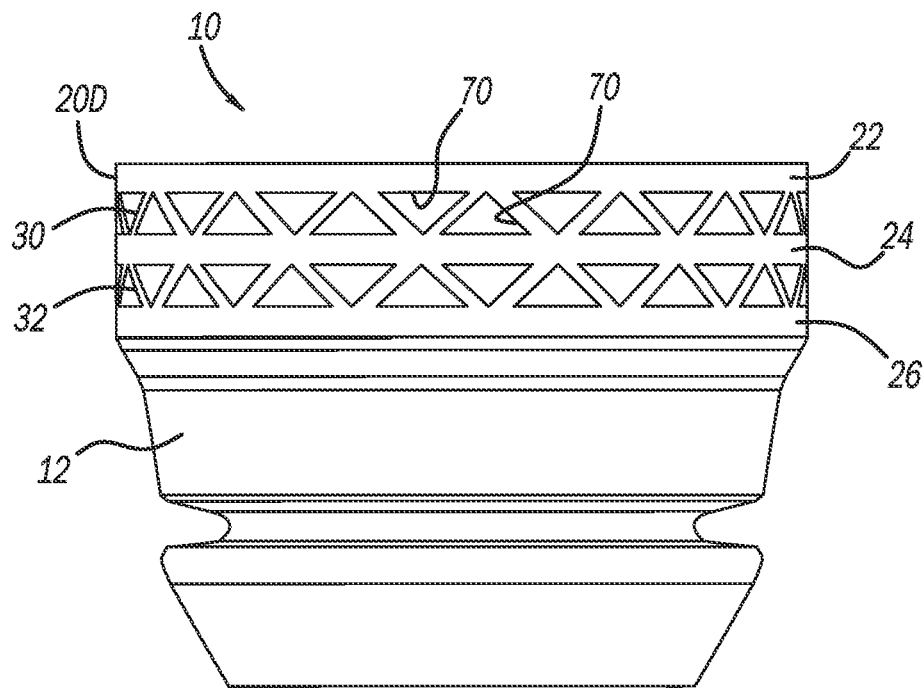
FIG. 9 is a side view of the jounce bumper including another exemplary insert in accordance with the present disclosure.

FIG. 9 illustrates the jounce bumper 10 configured with another insert 20D in accordance with the present disclosure. The insert 20D includes the first plate 22, the second plate 24, and the third plate 26. The insert 20D may alternatively include any other suitable number of plates. In the example of FIG. 9, the first connecting lattice 30 defines a plurality of triangular-shaped apertures 70. The triangular-shaped apertures 70 extend about an outer periphery of the insert 20D in an alternating arrangement of upright and upside down triangular-shaped apertures 70. The second connecting lattice 32 likewise includes the alternating triangular-shaped apertures 70. The triangular-shaped apertures 70 have a different energy absorption profile than the honeycombed shaped apertures 60, 62A, and 62B.

Figure 10:
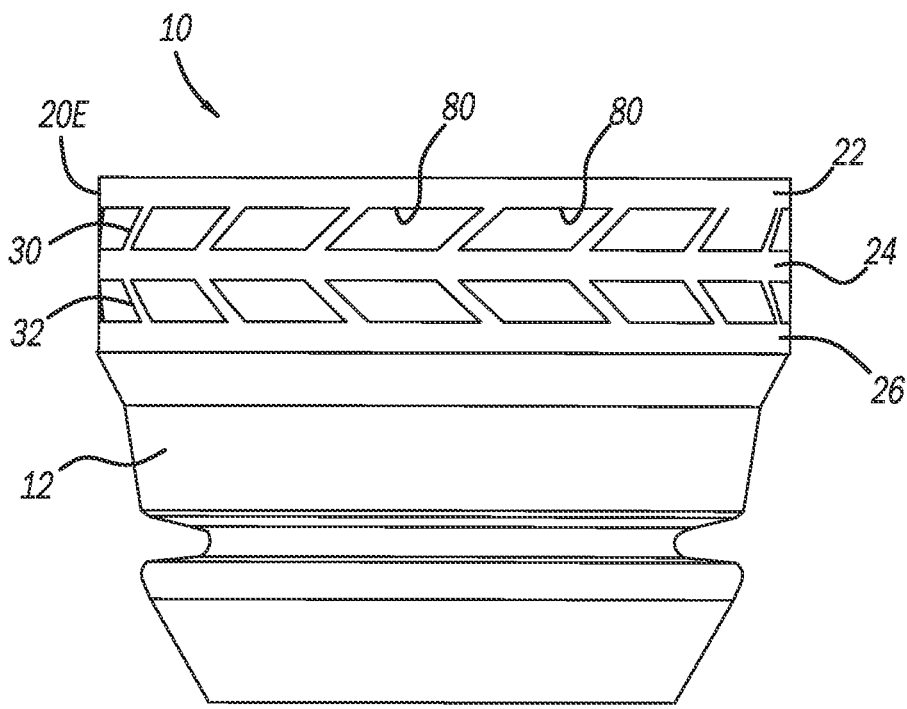
FIG. 10 is a side view of the jounce bumper with yet another exemplary insert in accordance with the present disclosure.

FIG. 10 illustrates another exemplary insert 20E in accordance with the present disclosure for the jounce bumper 10. The first and second connecting lattices 30, 32 define a plurality of parallelogram-shaped apertures 80. The parallelogram-shaped apertures 80 have a different energy absorption profile than the triangular-shaped apertures 70 and the honeycombed shaped apertures 60, 62A, and 62B. Thus, the jounce bumper 10 may be "tuned" by being outfitted with an insert including any suitable number of plates 22, 24, 26, 28, and one or more connecting lattices 30, 32, 34 with any of the apertures 60, 62A, 62B, 70, 80. The examples illustrated in FIG. 9 and FIG. 10 can be "tuned" as described above by changing the number, angle, and/or thickness of the lattices 30, 32, as well as the number and thickness of the plates 22, 24, 26. Each plate 22, 24, 26 and/or each lattice 30, 32 may be independently "tuned" for maximum flexibility.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A jounce bumper comprising:
a main body including a first polymeric material; and
an insert integral with the main body, the insert including
a second polymeric material that is different from the first polymeric material, the insert further including:
a first plate on top of the main body, the first plate defining first outer apertures outboard of an axial center of the jounce bumper;
a second plate defining second outer apertures outboard of the axial center, the second outer apertures aligned with the first outer apertures; and
a connecting lattice that connects the first plate and the second plate together;
wherein:
the first polymeric material of the main body is between the first plate and the second plate, and within the connecting lattice; and
the first plate including an outer top surface that is exposed and not covered by the first polymeric material, and the first polymeric material of the main body protrudes outward through the first outer apertures beyond the outer top surface of the first plate.

2. The jounce bumper of claim 1, further comprising a center aperture extending along a longitudinal axis of the jounce bumper and configured to receive a rod, the center aperture defined by each of the main body, the first plate, and the second plate.

3. The jounce bumper of claim 1, wherein the insert further includes at least one retention member configured to secure the jounce bumper at a mounting location.

4. The jounce bumper of claim 1, wherein:
the connecting lattice is a first connecting lattice; and
the insert further includes a third plate and a second connecting lattice that connects the second plate and the third plate together.

5. The jounce bumper of claim 4, wherein the insert further includes a fourth plate and a third connecting lattice that connects the third plate and the fourth plate together.

6. The jounce bumper of claim 1, wherein the connecting lattice extends about an outer perimeter of the insert.

7. The jounce bumper of claim 1, wherein the connecting lattice has one of a honeycomb shape, a triangle shape, and a parallelogram shape.

8. The jounce bumper of claim 1, wherein the connecting lattice defines a plurality of hexagonal apertures each one of which is between a first pair of opposing frustum-shaped apertures and a second pair of opposing frustum-shaped apertures.

9. The jounce bumper of claim 1, wherein the connecting lattice defines a plurality of triangular apertures arranged in alternating right side up and upside down orientations.

10. The jounce bumper of claim 1, wherein the connecting lattice defines a plurality of parallelogram-shaped apertures extending around an outer periphery of the insert.

11. The jounce bumper of claim 1, wherein the jounce bumper is configured to be mounted to a shock absorber for a vehicle.

12. The jounce bumper of claim 1, wherein the first polymeric material includes microcellular urethane, and the second polymeric material includes thermoplastic urethane.

13. A jounce bumper comprising:
a main body including a first polymeric material; and
an insert integral with the main body, the insert including
a second polymeric material that is more rigid than the first polymeric material, the insert including:
a first plate on top of the main body, a second plate, and a third plate each defining outer apertures spaced outward from a longitudinal axis of the jounce bumper, the outer apertures are aligned in a direction parallel to the longitudinal axis, the first polymeric material of the main body fills the outer apertures;
a first connecting lattice between the first plate and the second plate; and
a second connecting lattice between the second plate and the third plate;
wherein:
the first polymeric material of the main body is between the first plate and the second plate, between the second plate and the third plate, within the first connecting lattice, and within the second connecting lattice; and
the first plate including an outer top surface that is exposed and not covered by the first polymeric material, and the first polymeric material of the main body protrudes outward through the outer apertures of the first plate beyond the outer top surface of the first plate.

14. The jounce bumper of claim 13, wherein the first connecting lattice extends between an outer periphery of each of the first plate and the second plate, and the second connecting lattice extends between an outer periphery of each of the second plate and the third plate.

15. The jounce bumper of claim 13, wherein each one of the first connecting lattice and the second connecting lattice has one of a honeycomb shape, a triangle shape, and a parallelogram shape.

16. The jounce bumper of claim 13, wherein the first polymeric material includes microcellular urethane, and the second polymeric material includes thermoplastic urethane.

17. The jounce bumper of claim 13, further comprising a center aperture extending along the longitudinal axis of the jounce bumper, the center aperture defined by each of the main body, the first plate, the second plate, and the third plate.

18. A jounce bumper comprising:
a main body including microcellular urethane; and
an insert integral with the main body, the insert including thermoplastic urethane and the following:
a first plate on top of the main body, a second plate, and a third plate each defining outer apertures spaced apart from a longitudinal axis of the jounce bumper, the outer apertures are aligned in a direction parallel to the longitudinal axis, the microcellular urethane of the main body fills the outer apertures;
a first connecting lattice extending between an outer periphery of both the first plate and the second plate, the first connecting lattice defining a plurality of first openings arranged about the insert, the plurality of first openings filled with the microcellular urethane of the main body; and
a second connecting lattice extending between an outer periphery of both the second plate and the third plate, the second connecting lattice defining a plurality of second openings arranged about the insert, the plurality of second openings filled with the microcellular urethane of the main body; and a center aperture extending along the longitudinal axis of the jounce bumper, the center aperture defined by each of the main body, the first plate, the second plate, and the third plate;

wherein:

the microcellular urethane of the main body is between the first plate and the second plate and between the second plate and the third plate; and the first plate including an outer top surface that is exposed and not covered by the microcellular urethane, and the microcellular urethane of the main body protrudes outward through the outer apertures defined by the first plate beyond the outer top surface of the first plate.

\* \* \* \* \*